Dec. 23, 1947. W. O. MARTIN 2,433,139
BRAKE SLACK ADJUSTER
Filed June 15, 1945 2 Sheets-Sheet 1
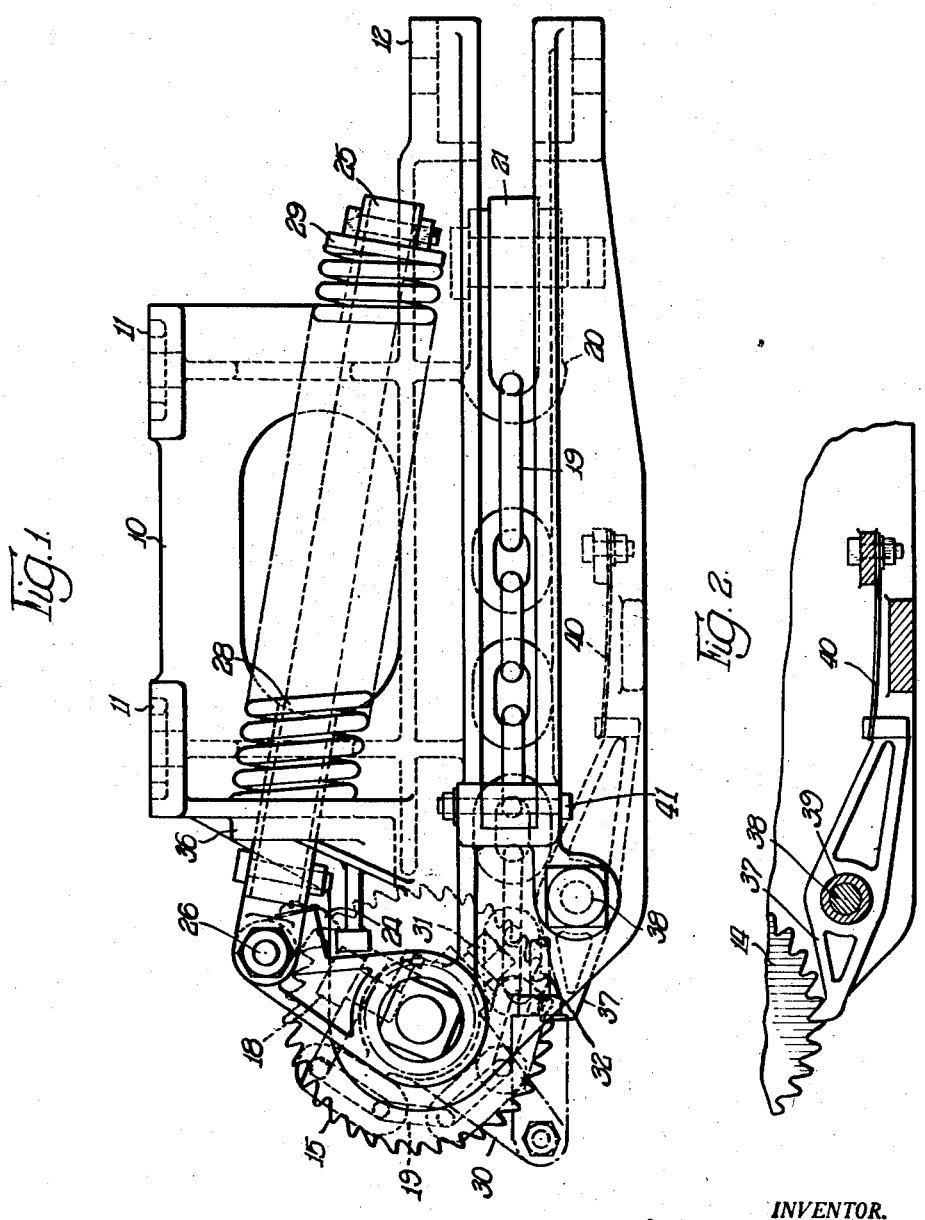
INVENTOR.
William O. Martin,
BY

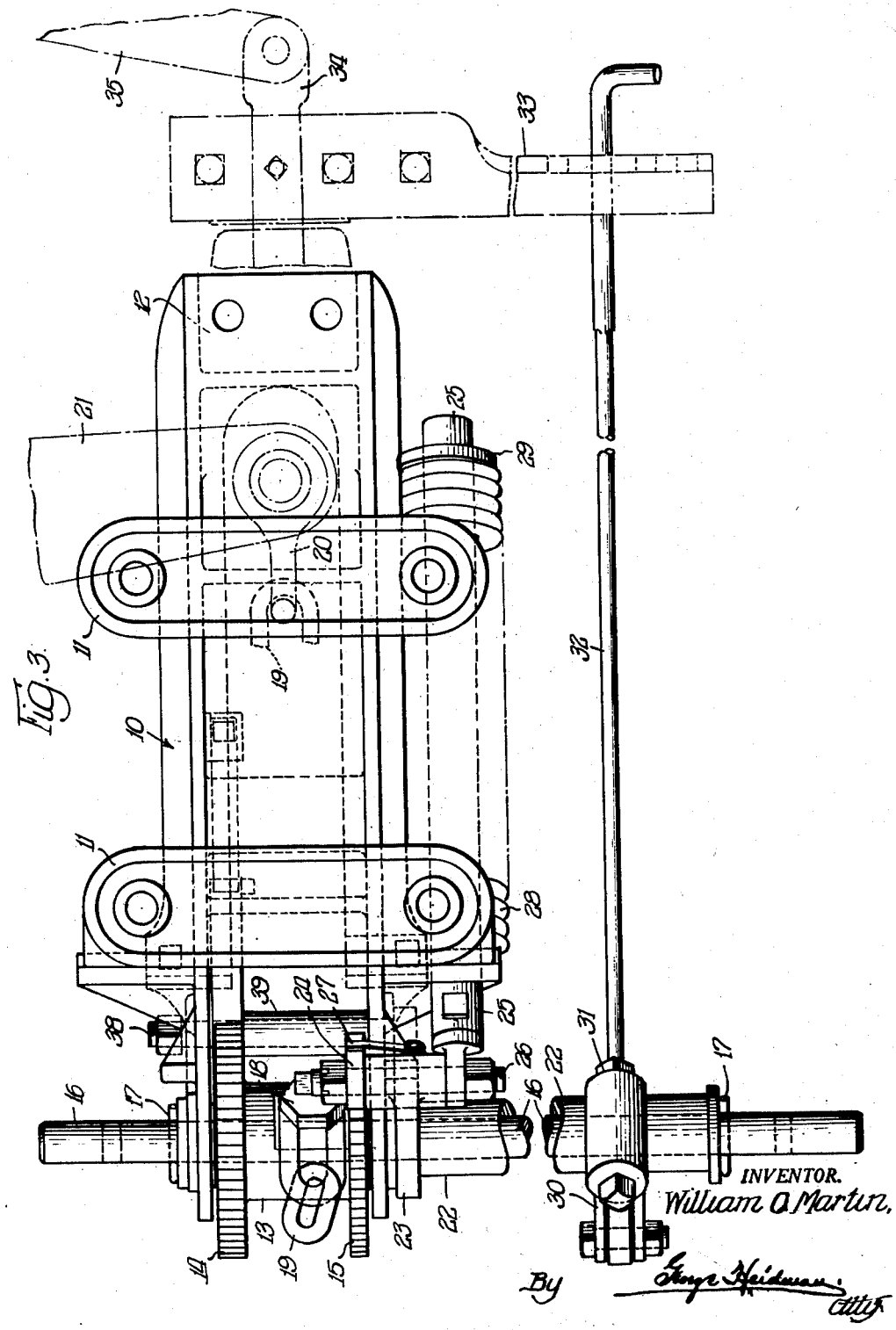

Patented Dec. 23, 1947

2,433,139

UNITED STATES PATENT OFFICE 2,433,139

BRAKE SLACK ADJUSTER

William O. Martin, Fort Smith, Ark., assignor to William O. Martin, Inc., Fort Smith, Ark., a corporation of Arkansas Application June 15, 1945, Serial No. 599,688

6 Claims. (Cl. 188—198)

My invention relates more particularly to automatic slack adjusters for the brakes of locomotive tenders and the brakes of railroad freight cars whereby undue play or slack in the brake applying mechanism will be automatically taken up or adjusted in order that the same and desired braking force or braking pressure may be provided and substantially equal piston travel of the respective brake cylinders obtained. As the respective brake cylinders receive substantially the same amount of compressed air, it is apparent that a lesser brake applying pressure is obtained by a longer traveling piston than is the case with a piston requiring a shorter travel to effect brake application and hence unequal braking force applied to different wheels of the tender or freight car. The serious conditions resulting from such unequal brake application are too well known to require recitation.

The object of my invention is to provide positively operating mechanical means of comparatively simple construction, adapted to automatically maintain a predetermined and uniform brake cylinder piston travel.

It is also an object of my invention to provide means whereby the adjuster may be manually controlled from the sides of the vehicle, independent of the automatic means, when desired.

The objects and advantages of my invention will be readily comprehended from the following detailed description of the accompanying drawings wherein—

Figure 1 is a side elevation of my improved slack adjuster with certain elements broken away.

Figure 2 is a detail sectional view of the ratchet holding pawl.

Figure 3 is a top plan view of the slack adjuster with certain intermediate portions broken away and shown in section.

The particular embodiment of my invention disclosed in the drawings involves a main frame 10 provided with bolting means 11 for attaching the device to the car body underframe, or to the brake cylinder pressure head at the place indicated at 12, whichever point happens to be the more desirable or more convenient.

Rotatably mounted between the extended ends of the two parallel side portions or terminal jaws of main frame 10 is a drum 13 whose opposite ends are annularly enlarged and provided with ratchet teeth as shown at 14 and 15; that is to say, the intermediate drum portion 13 and the ratchets 14 and 15 preferably are formed integral as shown in Figure 3. The ratchet-drum is journaled on a transversely disposed rod 16 which extends through suitable holes and bearings in the side frame and longitudinal movement of the rod prevented in any suitable manner as by cotter pins 17, 17; the rod extending beyond each end of the ratchet-drum and preferably into proximity with the car sides. The drum 13 is secured to the rod 16 by a suitable set-bolt 18 which also functions as means for securing one end of a chain 19 to the drum 13 so that the chain may wrap or wind about the periphery of the drum when the latter is properly rotated; the other end of the chain 19 being attached to the clevis 20 secured to the fulcrum end of the cylinder floating lever 21.

One of the extended ends of the ratchet-drum journal rod 16 is provided with a hollow or tubular shaft 22 whose inner end is provided with a lever 23 which is non-rotatably secured to the tubular shaft 22. The free end of lever 23 has a ratchet operating pawl 24 and an operating spring controlled rod 25 pivotally secured thereto at 26; the pawl 24 preferably being maintained in operative contact with ratchet 15 by means of a flat spring 27 carried by the outer end of lever or arm 23.

The rod 25 is slidably mounted in bracket portions, at one side of the main frame 10, which also provides an abutment or seat for one end of a suitable coil spring 28 which encircles the rod 25, whose outer or free end preferably is provided with an adjustable nut 29 whereby the spring 28 normally may be placed under a predetermined degree of compression.

The tubular shaft 22 at a suitable point is provided with a second lever 30 which is adjustably secured to tubular shaft 22 by the set-bolt 31. This method of securing the lever 30 to the shaft 22 enables the lever to be placed at any desired point along the tubular shaft in order to align the lever with varying conditions encountered on different railway cars. To provide a safety feature and indicator in the event of a broken brake beam, brake hanger, or any other hazardous condition which might allow the brake cylinder piston to travel its full stroke, the distance of travel in the compressibility of spring 28 is limited and compressed solid at a predetermined brake cylinder piston travel which is less than the full piston travel. Lever 30, held on hollow shaft 22 with set bolt 31, is set at approximately a 45° angle rearward of the vertical plane of the longitudinal axis of hollow shaft 22 as viewed in Figure 1, or at sufficient angle so that when the brake cylinder piston has traveled the required distance to compress spring 28 solid, lever 30 will approximate a vertical position.

Any further travel of brake cylinder piston caused by broken brake beam, brake hanger, or any other condition would then cause lever 30 to slip or twist forwardly on shaft 22 as shaft 22 could not be revolved due to spring 28 being compressed solid. Due to such twisting or slippage of the lever about shaft 22, lever 30 instead of returning to its normal position as shown in Figure 1 where the brakes are released will approximate a vertical position or rather a position forward of its initial normal position commensurate with the extent of slippage. Carmen or trainmen noticing this abnormal position of lever 30 would know it indicated some condition on the car that permitted brake cylinder piston to travel its full stroke and should make an inspection of the car for a defect, the discovery of what might prevent a serious, hazardous condition. This safety indicator feature is thought to be a very valuable feature in the operation of the brake mechanism. Lever or arm 30 is intended to impart rotative motion to the tubular shaft 22, through the action of a pull rod 32, of preselected length, whose outer end passes through a suitable opening in the extended end of a bracket arm 33 which is removably and adjustably clamped on the piston or push rod 34 of the brake cylinder, or connected with the live lever of which a portion is shown at 35; the bracket arm being secured in place by a suitable set-screw and bolts as shown. The outer end of pull-rod 32 is shown bent into hook form to prevent its withdrawal from the bracket arm 33; and this outer end normally extends beyond the normal or inactive position of the bracket arm a predetermined distance so as not to be affected by the bracket arm during normal travel of this piston rod. That is to say, the end of rod 32 extends beyond the bracket arm a distance commensurate with the ordinary travel of the piston rod and the bracket arm normally required for brake application; but in the event of brake shoe wear and hence increased travel of the piston beyond the preselected distance between the bracket arm and the outer hook-end of the rod 32 (required for brake application under normal conditions), the bracket 33 will exert pulling action on rod 32, thereby causing the lever 30 to rotate hollow shaft 22, to which lever 23 is nonrotatively secured, causing lever 23 to swing to the left in Figure 1 while its pawl 24 freely rides over the teeth of the ratchet 15 without rotating the drum 13 which is integral with the ratchet and hence without partially winding up the chain 19.

The rotative or swinging movement of lever 23 to the left as viewed in Figure 1, also causes the spring controlling rod 25 to move therewith—namely to the left in Figure 1, thereby compressing the coil spring 28 between the frame boss 36 and the nut and bolt indicated at 29.

In order to hold the drum against reverse or unwinding rotation, I provide a detent or pawl 37, freely mounted on the spindle or bolt 38 which preferably passes through a spacing sleeve 39 arranged between the terminal jaws or ends of the main frame 10. The detent or pawl 37 is maintained in constant contact with the lower side of ratchet 14 and its oppositely presented teeth by a suitable flat spring 40 as shown in Figure 2. This detent or pawl 37 prevents the chain winding drum and its integral ratchets from clockwise rotation in Figure 1, namely in chain unwinding direction.

The hollow shaft 22, as previously stated, is not operatively connected with the solid shaft or rod 16 and hence the latter is not affected by the rotative movements of the hollow shaft 22. The shaft or rod 16, however, is operatively connected with the chain drum 13 through the medium of set-bolt 18, thus permitting manual rotation of the drum and hence slack adjustment to be obtained, independently of the automatic means, by applying a suitable wrench or crank to either of the ends of rod 16.

The device preferably is provided with a removable safety release member or bolt 41, normally limiting the travel of the floating lever. When the floating lever 21 has traveled into engagement with bolt 41, it indicates that the brake shoes are so worn as to require replacement. By removing bolt 41, the lever 21 can be moved to the end of the slotway (see Figure 1) which provides sufficient slack to enable release of pawl 37 and permit the drum to be moved in unwinding direction.

The operation of my improved slack adjuster—after adjustments of bracket 33 on the brake cylinder piston rod 34 and the outer hooked end of pull rod 32 relative to the normal travel of the bracket—is as follows:

As the brake shoe wear progresses, the shoe clearance increases and consequently the piston rod travel also increases. When the travel of the piston rod increases beyond the normal predetermined distance, its bracket 33 will engage the outer extended end of the pull rod 32, and, through the medium of lever 30, will induce rotative movement of hollow shaft 22 to which operating pawl carrying lever 23 is intimately secured, thereby carrying its pawl 24 to initiate rotation of ratchet 15 and the integral chain winding drum 13; the degree of rotative movement of the drum being controlled by the degree of rearward swing of lever 23 and the number of ratchet-teeth over which pawl 24 has freely slid during the rearward swing of the lever 23—all being dependent upon the degree or extent of travel of the pull-rod 32, which represents the excess travel of the brake cylinder piston-rod beyond the normal limit of travel.

Simultaneously with the rearward swing of pawl carrying lever 23, spring carrying rod 25 is also moved in a rearward direction, as viewed in the figures, and its encircling coil spring 28 compressed thereby increasing the forward pulling force on the lever 23 and its ratchet operating pawl 24. After the brake is released and the brake cylinder piston rod with its attached bracket 33 returns to normal position, namely to the left in the drawings, the hollow shaft and attached lever 23 with its actuating pawl 24, due to the increased spring pressure on rod 25, will move forwardly or toward the right in the drawings, thereby rotating the ratchet-drum the same angular amount or degree as the number of teeth over which the pawl 24 freely rode during brake application.

This operation winds up the chain 19 and pulls the fulcrum end of the dead lever 21 rearwardly or away from the brake cylinder, transmitting its movement through the brake leverage system, thereby reducing the clearance between the brake shoes and wheels and consequently reduces the piston travel to its predetermined or normal amount.

As the detent or pawl 37 is in constant contact with ratchet 14 (integral with the other end of the drum) the drum 13 will be held against rotation in an unwinding direction, so that the takenup slack will be retained until renewal of the brake shoes necessitates the complete unwinding of the chain 18.

The removable safety release block 41, connected at the floating lever guide, is for the purpose of facilitating the disconnnection of the chain from the fulcrum end of the cylinder dead lever by providing a little slack when required to renew the brake shoes. By disengaging the safety pawl or dent 37 and the operating ratchet pawl 24, the combined ratchet wheels and drum may be turned so as to quickly unwind the chain, which may be accomplished by applying a suitable wrench to either end of the shaft or rod 16.

After new brake shoes have been applied, no manual adjustments of the brakes are necessary because with a few applications of the brakes by either air or hand brake, the slack adjuster will automatically properly readjust the piston travel.

Due to the difference in the piston travel on freight cars and locomotive tenders when they are empty or loaded, lever 30 and the pitch of the ratchet teeth are so proportioned that the slack adjuster and its operation will take care of this difference in piston travel; namely known as false piston travel. For illustration, on an empty freight car standing still with a seven inch piston travel, the false piston travel on this car would be approximately one inch with the car loaded and moving. By shortening lever 30 and/or reducing the pitch of the ratchet teeth the slack adjuster would become more sensitive in its operation. The longer lever 30 is made and/or a greater pitch of ratchet teeth, the more sluggish the action of the slack adjuster would become, due to the fact that lever 30 would have to be pulled farther before operating pawl 24 would engage another ratchet tooth. It can readily be seen, therefore, that by varying the length of lever 30 and/or the pitch of the ratchet teeth 14 and/or 15 the desired amount of allowable false piston travel may be obtained without effecting the critical piston travel to prevent an insufficient amount of clearance between the brake shoes and wheels.

By providing ratchet wheels or teeth at both ends of the drum permits the slack adjuster to be employed or reversed for what may be termed either as right or left hand operation, thus adapting its use, without structural changes, to various cars and different practices employed on the different railroad systems of this country; the ratchet wheel 14 being shown of somewhat greater width than ratchet wheel 15 in order to provide greater purchase or holding power for the detent during braking operations. Then too, other means may be employed, to be actuated through operation of the brake cylinder piston for imparting movement to the slack take-up mechanism, instead of direct contact with the piston rod or push rod as disclosed.

I have shown what I believe to be a simple embodiment of the invention, described in terms of description and not as terms of limitation, as structural modifications are possible and may be made without, however, departing from the spirit of my invention as defined in the appended claims.

What I claim is:

1. Brake slack adjuster mechanism comprising, in combination with the brake cylinder push rod and the floating lever of a brake rigging, a supporting frame for the adjuster mechanism and for securing it to a car underframe; a drum with a ratchet wheel associated therewith journaled in one end of said frame at a distance removed from the floating lever; a flexible element secured to the fulcrum end of the floating lever arranged at the opposite end of said frame, with the other end secured to said drum to be wound thereon; a rotatable shaft arranged on the drum journal and provided with a pair of radially disposed arms; a pawl carried by one of said arms, arranged in engagement with the teeth of said ratchet wheel, adapted to loosely ride over the ratchet-teeth when said arm swings in one direction and to rotate the ratchet wheel and associated drum when the arm swings in the opposite direction; a spring controlled power exerting rod arranged in said frame and pivotally connected at one end to said pawl carrying arm for moving said arm in the last mentioned direction when said lever moves back to brake release position; a pull rod secured to the other of said radial arms on the rotatable shaft; and means adapted to be adjustably secured to the cylinder push rod and arranged to effect operative relation with said pull rod when the cylinder push rod travels outwardly beyond a predetermined extent; and means whereby unwinding rotation of said drum is prevented.

2. Brake slack adjuster mechanism comprising, in combination with the brake cylinder push rod and a lever of the brake rigging, a main frame for supporting the mechanism and securing the latter in place; a shaft journaled in one end of the frame and extending to opposite sides of the car; a drum mounted on and operatively secured to said shaft and provided with ratchet teeth; a flexible element secured at one end to said lever and at its other end to said drum to wind thereon; a hollow shaft loosely journaled on said first shaft adjacent the ratchet-tooth end of the drum; a pair of radial oppositely disposed arms secured to said hollow shaft to rotate therewith; one of said arms being adjustable on said shaft; a pawl carried by one of said arms, adapted to ride over the ratchet teeth when the arms swing in one direction and to engage the teeth to rotate the drum when the arms return to normal position; a pull rod slidably mounted in said frame with one end pivotally secured to one of said arms; a regulable coil spring encircling said rod adapted to be placed under compression when the arm swings away from normal position thereby forcing the pull rod and pawl carrying arm toward initial position and induce the flexible element to wind on the drum; a pull member secured to the other of said arms; means adjustably secured to the cylinder push rod and adapted to effect pulling engagement with said pull member when the cylinder push rod travels beyond a predetermined degree and thereby swing said arms into position to effect slack take-up operation when said last mentioned means moves out of pulling engagement with said pull member; and means whereby the drum is held against unwinding rotation.

3. Brake slack adjuster mechanism comprising, in combination with the brake cylinder push rod and the floating lever of a railroad car brake rigging, a supporting frame whereby the mechanism may be secured to a car underframe; a drum with an associated ratchet wheel rotatably mounted at the one end of said frame; a slack takeup flexible element secured at one end to said floating lever with the other end secured to said drum to wind thereon; a safety release member removably secured to said frame and constituting a stop for the floating lever whereby additional movement of the floating lever and of the drum may be obtained; a transverse shaft rotatably disposed through the frame and said drum with the latter operatively secured thereto, said shaft extending to opposite sides of the car whereby manual release and adjustment of the slack adjuster mechanism may be made; a pair of radially disposed arms secured at opposite ends of a hollow shaft rotatably mounted on said transverse shaft; a pawl carried by one of said arms adapted to ride over the ratchet wheel when the arm swings in one direction and to engage the ratchet-teeth and to rotate the drum when the arm swings in the opposite direction; spring mechanism mounted in said frame and connected with said pawl carrying arm adapted to be compressed when the pawl-carrying arm swings in ratchet riding direction, adapted to return said arms to normal position and thereby rotate said drum in winding direction; a bracket arm adjustably secured to the cylinder push rod; a pull rod pivotally connected at one end to the other of said pair of arms, while the other end slidably extends through said bracket arm a predetermined distance corresponding to the normal travel of the cylinder push rod with its outer end formed to effect operative engagement with the bracket arm; and means whereby the drum is held against unwinding rotation.

4. Brake slack adjuster mechanism comprising, in combination with the brake cylinder push rod and the floating lever of a railroad car brake rigging, a supporting frame whereby the mechanism may be secured to a car underframe; a safety release member removably secured to the frame whereby additional movement of the floating lever may be obtained; a transversely disposed shaft extending to the car sides and rotatably mounted in the opposite end of said frame whereby the mechanism may be manually operated; a drum with an associated ratchet wheel operatively secured to said shaft; a slack take-up flexible element secured at one end to said floating lever and at the other end secured to said drum to wind thereon; a hollow shaft rotatably mounted on said first mentioned shaft and free to rotate thereon; a pair of radially disposed arms secured at opposite ends of said hollow shaft, one of said arms being non-rotatably secured to the shaft while the other arm is adjustably secured to said shaft; a pawl, carried by the first mentioned arm, adapted to ride over the ratchet wheel of the drum when the arm swings in one direction and to engage the ratchet-teeth and to rotate the drum when the arm swings in the opposite direction; spring mechanism arranged in said frame and connected with the pawl-carrying arm, adapted to be compressed when the cylinder push-rod moves outwardly in brake applying direction and to return the pawl-carrying arm to normal position and thereby rotate said drum in winding direction; adjustable means secured to the cylinder push-rod; a pull rod pivotally connected at one end to the adjustably mounted arm while the other end has predetermined slidable connection with said adjustable means corresponding to the normal travel of the cylinder push rod, said pull rod being adapted to effect operative engagement with said adjustable means when the push-rod exceeds its normal travel, said pull-rod causing the adjustably secured radial arm to shift about said hollow shaft out of normal position when the spring mechanism is completely compressed through excessive push-rod movement; and means whereby the drum is held against unwinding rotation.

5. Brake slack adjuster mechanism comprising, in combination with the brake cylinder push rod and the floating lever of a railroad car brake rigging, a supporting frame whereby the mechanism may be secured to a car underframe; a safety release member removably secured at one end of said frame whereby additional movement of the floating lever may be obtained; a transversely disposed shaft extending through the end of said frame and rotatable therein, said shaft extending to opposite sides of the car to permit manual operation thereof; a drum provided with ratchet teeth at opposite ends and secured on said shaft to rotate therewith; a flexible slack take-up element secured to said floating lever and to said drum so as to wind on the latter; a hollow shaft loosely mounted on said transverse shaft at one end of said drum; a pair of radially disposed arms, one arm being immovably secured at the end of the hollow shaft adjacent said drum while the other arm is adjustably secured adjacent the other end of said hollow shaft and at a prearranged degree of angle removed from the plane of the first arm; a pawl pivotally secured to the first arm to effect meshing relation with the ratchet teeth at one end of the drum when the arm moves in one direction; a spring carrying rod slidably mounted in said frame with one end pivotally secured to the pawl carrying arm and with one end of the spring seated against the frame; a spring pressed pawl carried by the frame in operative relation with one set of ratchet teeth on the drum to hold the latter against unwinding rotation; a bracket arm adjustably secured to the cylinder push rod; and a pull rod pivotally connected with said adjustable radial arm and slidable through said bracket arm to a predetermined degree corresponding with the normal travel of the cylinder push rod in brake applying direction but adapted to effect operative engagement with said bracket arm when the push rod exceeds its prearranged normal brake applying travel thereby rotating said hollow shaft and its pawl carrying arm into drum rotating position against the pull of said spring carrying rod, said adjustably mounted radial arm being adapted to rotatively shift on the hollow shaft when said spring of the spring carrying rod becomes seated by excessive push rod movement.

6. Brake slack adjuster mechanism comprising, in combination with the brake cylinder push rod and the floating lever of a railroad car brake rigging, an elongated supporting frame whereby the mechanism may be secured to a car underframe; a drum with an associated ratchet wheel rotatably mounted at one end of said frame; a slack take-up flexible element secured at one end to said lever with the other end secured to said drum to wind thereon; a safety release member secured to said frame intermediate the ends in the path of the floating lever; a transverse shaft rotatably disposed through the frame and said drum with the latter operatively secured thereto, said shaft extending to opposite sides of the car whereby manual release and adjustment of the slack adjuster mechanism may be made; a pair of radially disposed arms secured at opposite ends of a hollow shaft rotatably mounted on said transverse shaft; a pawl carried by one of said arms adapted to ride over the ratchet wheel when the arm swings in one direction and to engage the ratchet-teeth and to rotate the drum when the arm swings in the opposite direction;

spring mechanism mounted in said frame and connected with said pawl carrying arm whereby said hollow shaft and pair of arms are returned to normal position and said drum rotated in winding direction; a bracket arm adjustably secured to the cylinder push rod; a pull rod pivotally connected at one end to the other of said pair of arms for rotating said hollow shaft and pair of arms when the pull rod travels beyond a prearranged distance, while the other end of the rod slidably extends through said bracket arm a predetermined distance corresponding to the normal travel of the cylinder push rod, the outer end of said rod being formed to effect operative engagement with the bracket arm when the latter travels beyond said predetermined distance; and means whereby the drum is held against unwinding rotation.

WILLIAM O. MARTIN.

REFERENCES CITED

The following references are of record in the file of this patent:

UNITED STATES PATENTS

| Number | Name | Date |
|---|---|---|
| 778,597 | Mundy | Dec. 27, 1904 |
| 1,144,453 | Wood et al. | June 29, 1915 |